United States Patent
Simpson

[11] Patent Number: 6,145,242
[45] Date of Patent: Nov. 14, 2000

[54] PEST MANAGEMENT SYSTEM

[75] Inventor: Arthur W. Simpson, Honolulu, Hi.

[73] Assignee: Integrated Pest Management Technologies, Inc., Honolulu, Hi.

[21] Appl. No.: 09/021,157

[22] Filed: Feb. 10, 1998

Related U.S. Application Data

[63] Continuation of application No. 08/658,477, Jun. 5, 1996, abandoned.

[51] Int. Cl.[7] .............................. A01M 1/20; A01M 25/00
[52] U.S. Cl. ................................................. 43/131
[58] Field of Search ........................................ 43/67, 131

[56] References Cited

U.S. PATENT DOCUMENTS

| | | |
|---|---|---|
| 1,700,517 | 1/1929 | Ross ........................................... 43/131 |
| 3,320,692 | 5/1967 | Hellen . |
| 4,326,817 | 4/1982 | Boiardi . |
| 4,637,162 | 1/1987 | Sherman . |
| 4,660,320 | 4/1987 | Baker et al. . |
| 4,930,251 | 6/1990 | Crisanti ...................................... 43/131 |
| 5,231,791 | 8/1993 | Falkson ...................................... 43/131 |
| 5,272,832 | 12/1993 | Marshall ................................... 43/131 |
| 5,275,125 | 1/1994 | Rotramel . |
| 5,357,709 | 10/1994 | Lin ............................................ 43/131 |
| 5,448,852 | 9/1995 | Spragins ................................... 43/131 |
| 5,605,023 | 2/1997 | Biernazki . |
| 5,627,231 | 5/1997 | Shalov et al. . |
| 5,677,017 | 10/1997 | Freeman . |
| 5,737,870 | 4/1998 | Thind ....................................... 43/131 |
| 5,802,761 | 9/1998 | Demarest ................................. 43/131 |
| 5,806,237 | 9/1998 | Nelson ..................................... 43/131 |

*Primary Examiner*—Kurt Rowan
*Attorney, Agent, or Firm*—Arthur W. Simpson

[57] ABSTRACT

An integrated pest management system includes an enclosure having a bottom, and a top configured to resemble a natural rock, at least one doorway in the top, allowing the pest to access the interior, and a bait station inside the enclosure for holding bait.

12 Claims, 6 Drawing Sheets

PEST MANAGEMENT SYSTEM

This is a continuation of Ser. No. 08/658,477 Jun. 5, 1996 now abandoned.

FIELD OF THE INVENTION

This invention relates to pest control and more specifically to an integrated pest management system.

BACKGROUND AND SUMMARY OF THE INVENTION

One method of pest control involves selectively positioning bait stations in the area to be controlled. Existing bait stations are unattractive and do not blend in with the environment. Thus, their use is limited in some locations because of their unsightly appearance which often draws attention to the fact there is a pest control problem. Furthermore, most of the existing bait stations are adapted to control one particular type of pest, thus, several different stations are required to combat a variety of pests.

The integrated pest management system of the present invention is adapted to be camouflaged so that it can blend in with the environment. The pest management system is adaptable for use in controlling a wide variety of pests, including insects and rodents. Generally, the integrated pest management system comprises an enclosure having a bottom and a top. The top may be configured to resemble a natural rock, to disguise the device. There is at least one doorway in the top allowing a pest to access the interior of the enclosure. The doorway is surrounded by a channel for mounting a door panel in the doorway. The door panel is preferably cuttable so that the size of the doorway opening can be adjusted with the panel. There is a bait station inside the enclosure for holding bait, which is typically poisoned. A screen inside the enclosure opposes, but is spaced from, the doorway to limit the size of pest that can enter the enclosure. A well is positioned inside the enclosure adjacent to the doorway for holding liquid or granulds, attractant or repellent for pests that crawl into the enclosure.

The integrated pest management system of the present invention provides an enclosure for delivering existing bait and lures for many different types of pests. The integrated pest management system can be configured to resemble a natural rock, so that it can blend in with the surroundings without drawing attention to the need for pest management.

These and other features and advantages will be in part apparent, and in part pointed out hereinafter.

BRIEF DESCRIPTION OF THE DRAWINGS

Corresponding reference numerals indicate corresponding parts throughout the drawings.

DETAILED DESCRIPTION OF THE PREFERRED EMBODIMENT

Figure 1:
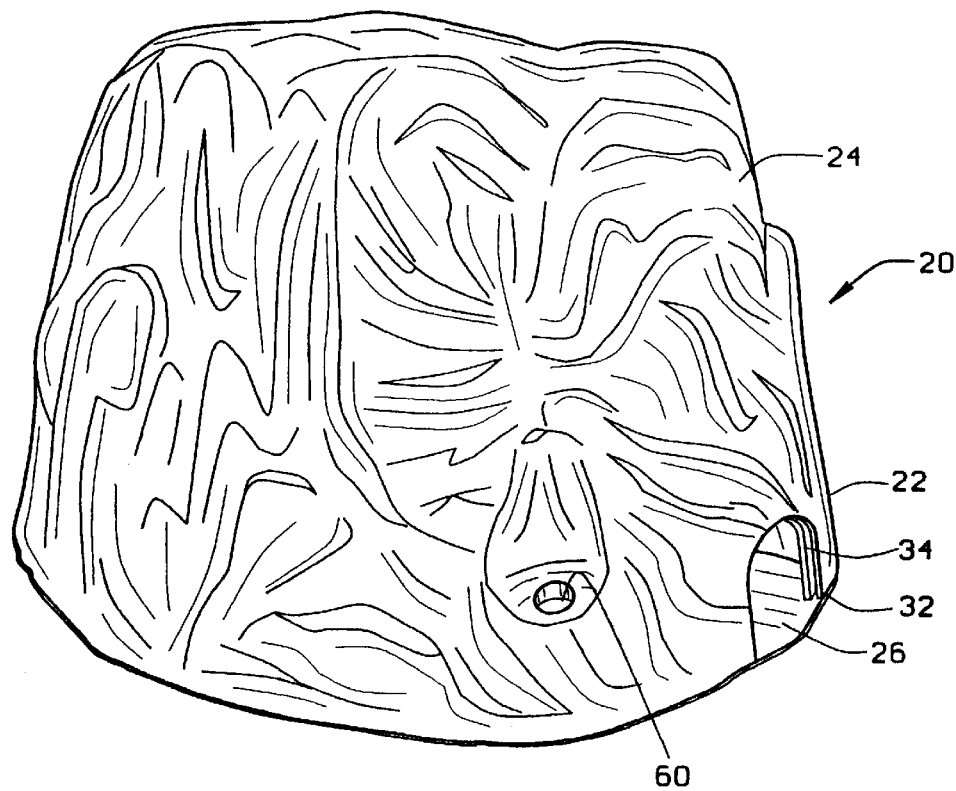
FIG. 1 is a perspective view of an embodiment of an integrated pest management system constructed according to the principles of this invention.
Figure 2:
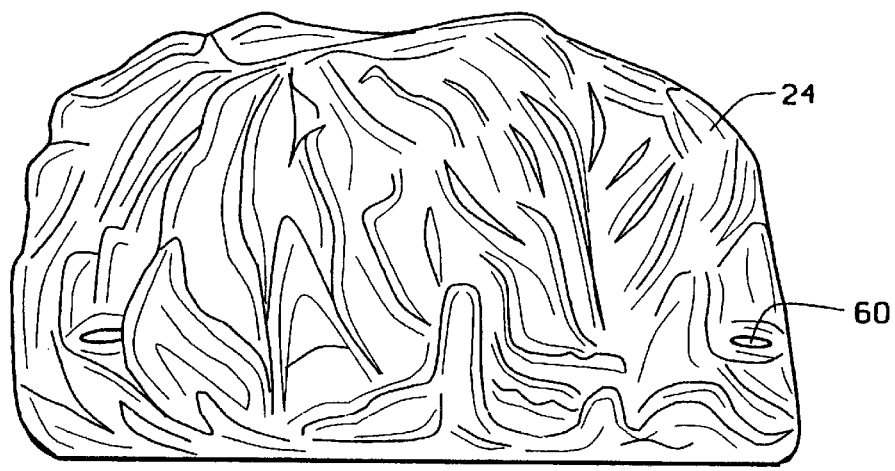
FIG. 2 is a front elevation view of the integrated pest management system.
Figure 3:
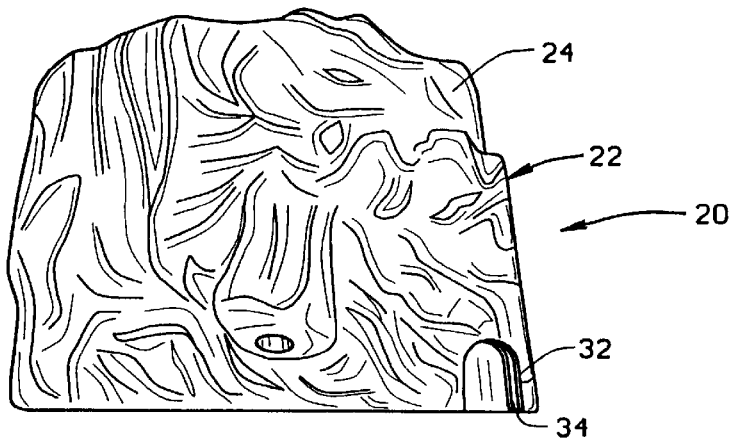
FIG. 3 is a right side elevation view of the integrated pest management system.
Figure 4:
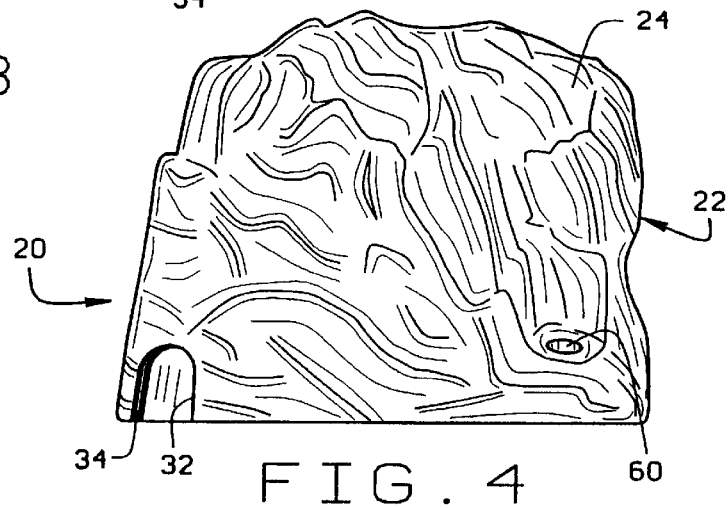
FIG. 4 is a left side elevation view of an integrated pest management system.
Figure 5:
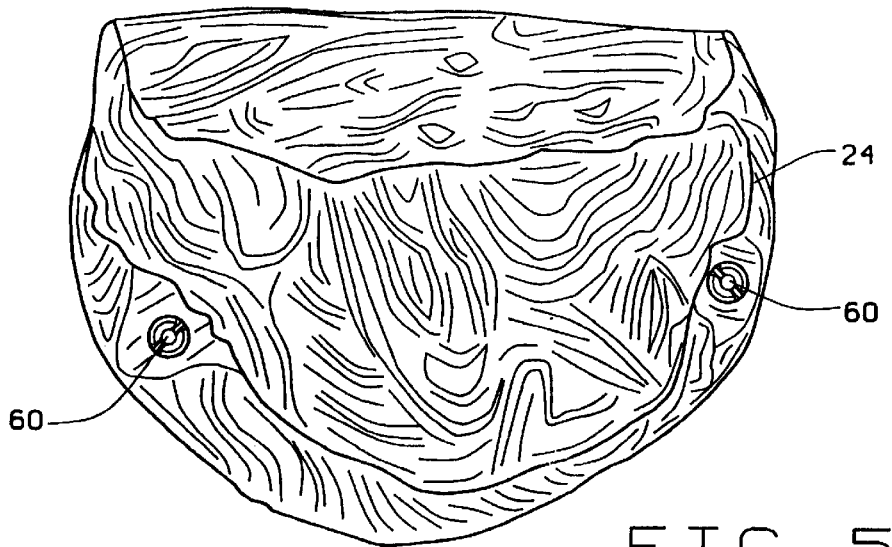
FIG. 5 is a top plan view of the integrated pest management system.
Figure 6:
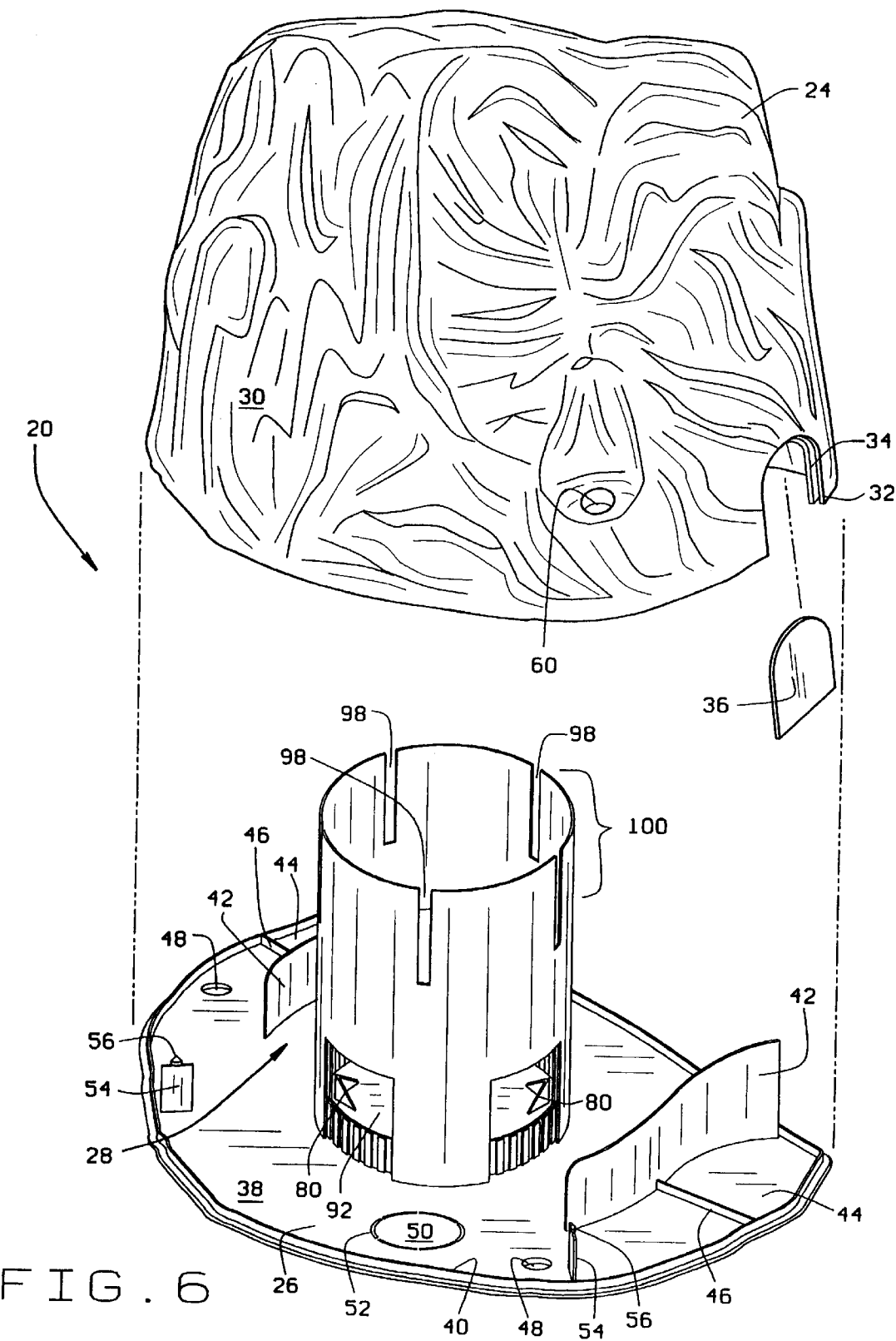
FIG. 6 is an exploded perspective view of an integrated pest management system showing its component parts.
Figure 7:
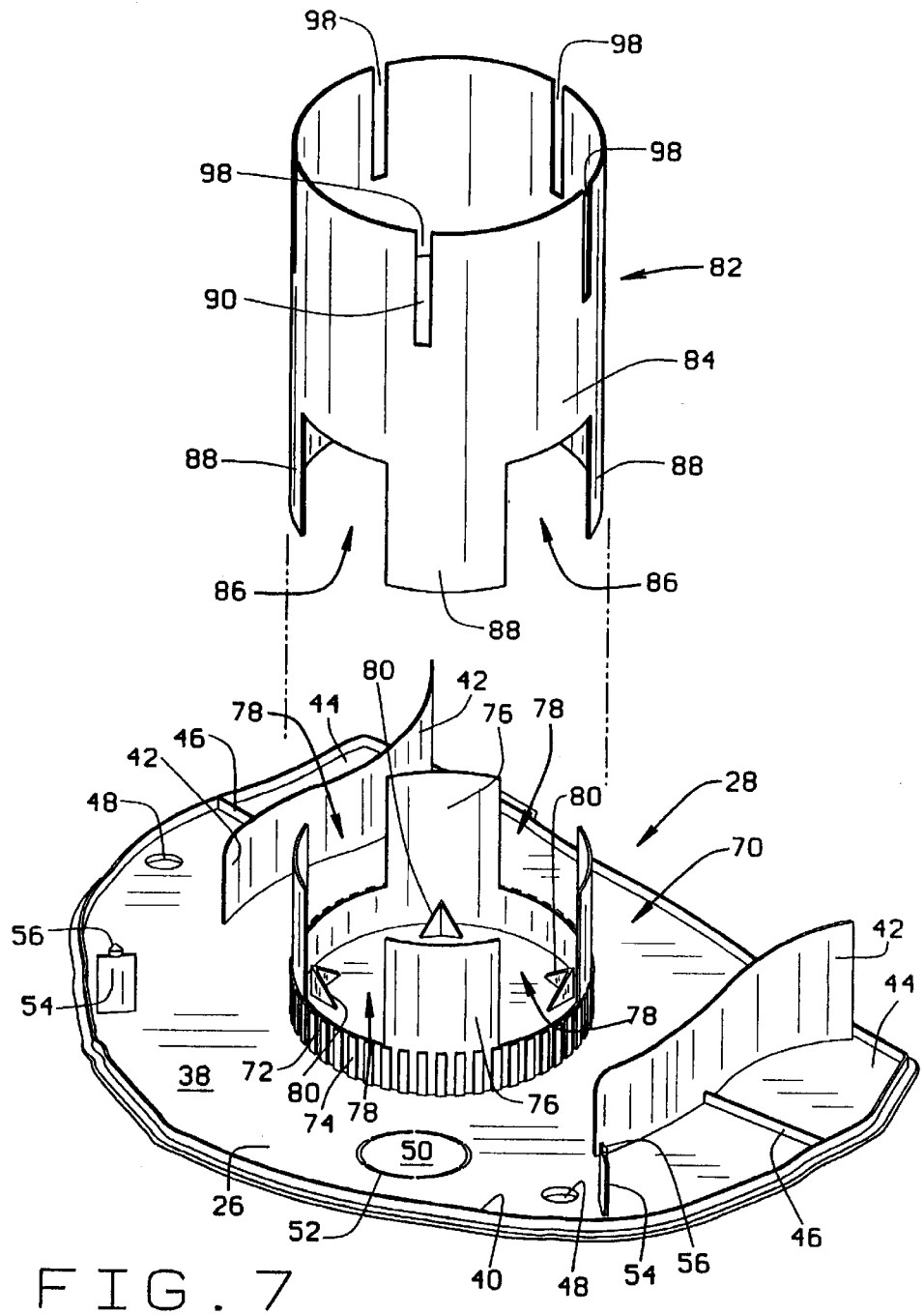
FIG. 7 in an exploded perspective view of the bottom of the integrated pest management system, showing the bait holder.
Figure 8:
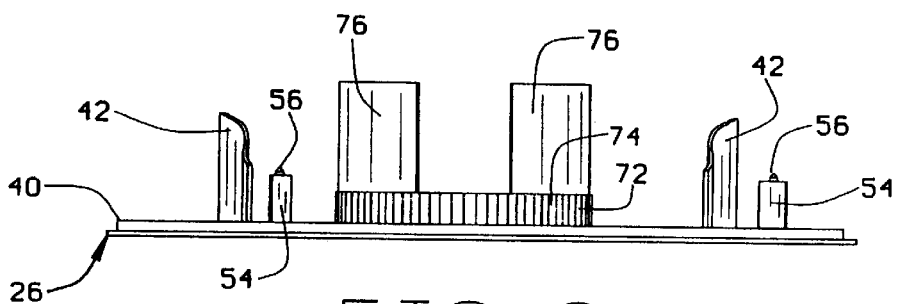
FIG. 8 is a front elevation view of the bottom of the integrated pest management system.
Figure 9:
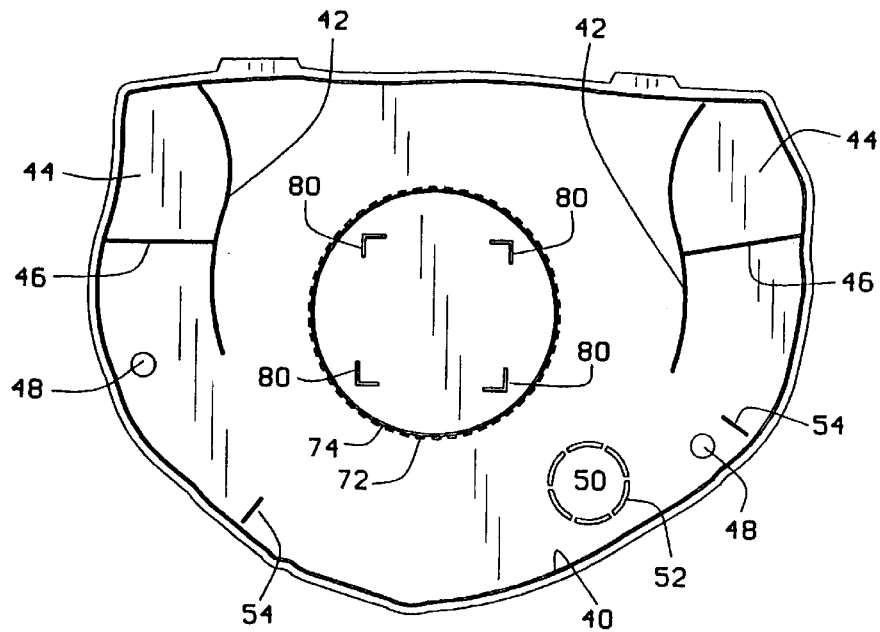
FIG. 9 is a top plan view of the bottom of the integrated pest management system.
Figure 10:
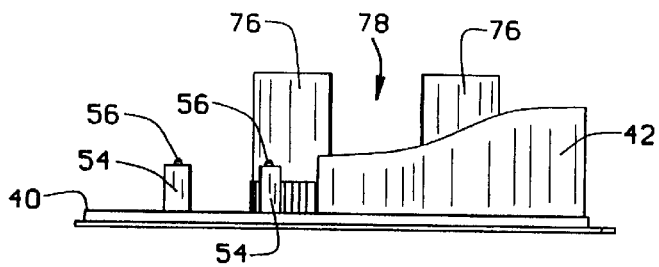
FIG. 10 is a right side elevation view of the bottom of an integrated pest management system constructed according to the principles of this invention.
Figure 11:
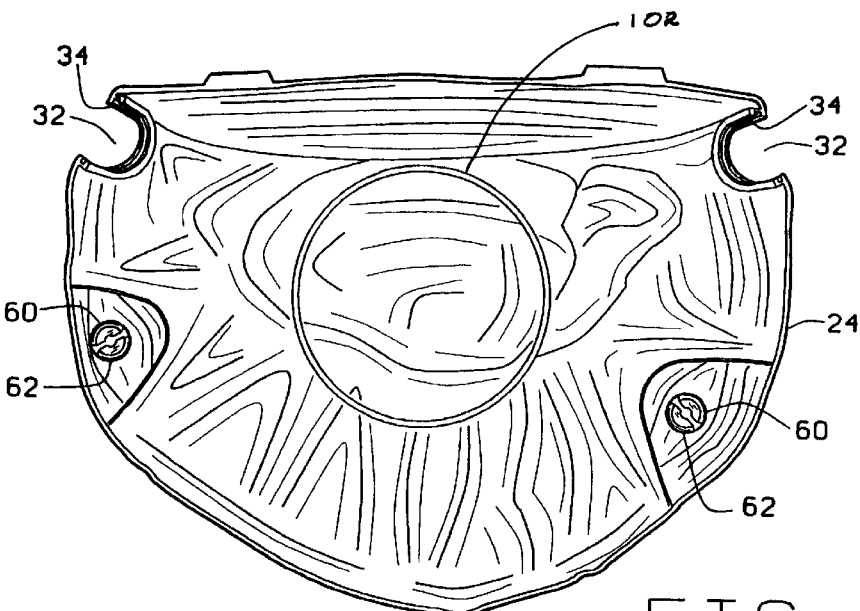
FIG. 11 is a bottom plan view of the cover of the integrated pest management system.
Figure 12:
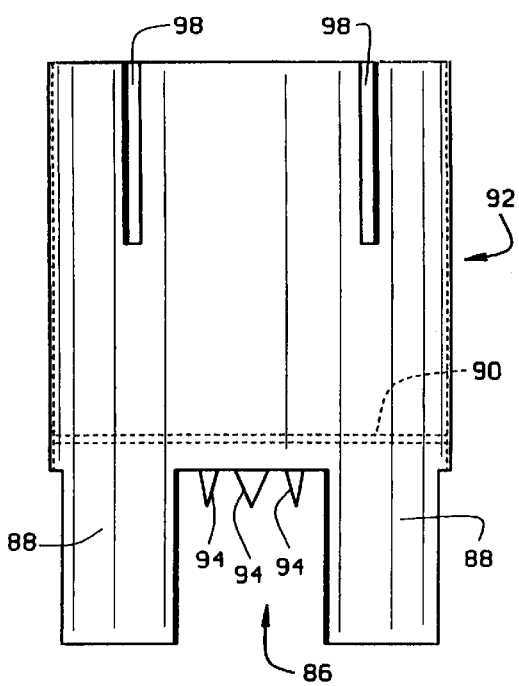
FIG. 12 is a side elevation view of the cap for the bait station in the integrated pest management system.
Figure 15:
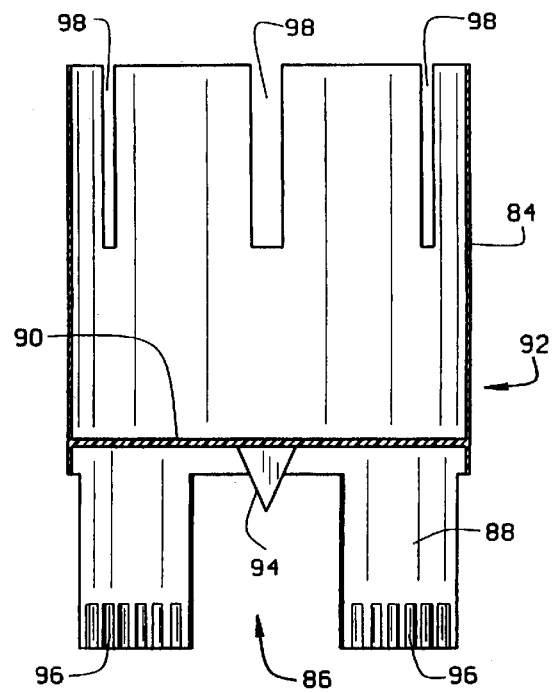
FIG. 15 is a vertical cross-sectional view of the cap taken along the plane of line 15—15 of FIG. 14.
Figure 13:
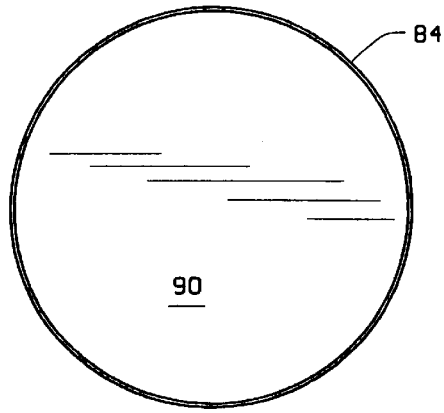
FIG. 13 is a top plan view of the cap for the bait station in the integrated pest management system.
Figure 14:
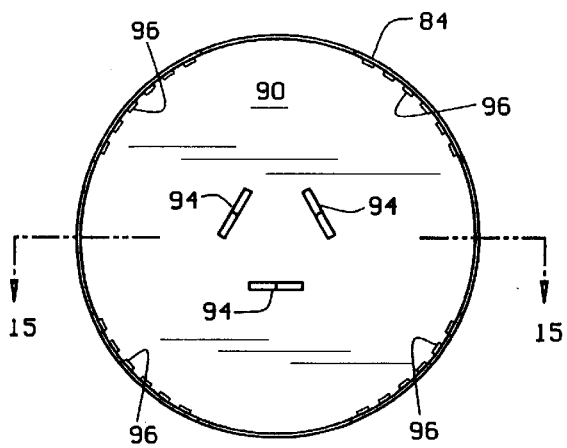
FIG. 14 is a bottom plan view of the cap for the bait station in the integrated pest management system.

An embodiment of an integrated pest management system constructed according to the principles of this invention is indicated generally as 20 in FIG. 1. The pest management system 20 is adaptable for use in controlling wide variety of pests from insects to animals. The system can be configured to resemble a rock so that it can be discretely placed in the area to be controlled and blend in with the surroundings without drawing attention to itself or the need for using a pest management system 20. As shown in FIG. 6, the pest management system 20 comprises an enclosure 22 formed by a cover 24 that interfits with a bottom 26, and having a bait station 28 inside.

The cover 24 is preferably configured to resemble a rock, with a rough surface 30. That is, the cover is configured to resemble rock having a form and appearance found in nature. As shown in the Figures, the cover preferably has a rough, irregular appearance. This appearance allows system 20 to be discretely placed outside in the area to be controlled, without calling attention to the pest control efforts. The cover 24 can be made of molded plastic or fiberglass, or some other suitable material. There is at least one, and there are preferably two doorways 32 in the cover 24 for allowing pests access to the interior of the enclosure 22. The doorways are preferably positioned on opposite sides of the cover 24. This makes the enclosure 22 more inviting to pests. Each doorway 32 has a channel 34 around its periphery for mounting a panel 36. The panel 36 can be mounted in the channel 34 to close the doorway. Alternatively, an opening can be cut in the panel of appropriate size and shape for the particular pest to be controlled, and the panel can be mounted in the channel 34 in the doorways 32 to adapt the system 20 for controlling that particular pest. The panel 36 is preferably made from a strong, but cuttable plastic.

The bottom 26 comprises a generally flat, roughly semi-circular plate 38. The bottom can be made from molded plastic or fiberglass or some other suitable material. The bottom 26 has a raised lip 40 adjacent its periphery that interfits with the bottom edge of the cover 24. There are vertical panels 42 projecting upwardly from the plate 38, spaced inwardly from the edge of the plate in a position to be opposite the doorways in the cover 24. The panels 42 block the view of the interior from the doorway 32, and also restrict the size of the animal that can enter the enclosure 22. Thus, the panels 42 help prevent children or pets from accessing the interior of the enclosure 22.

A well 44 is formed in the bottom 26 in a position to be adjacent each doorway 32. Each well 44 is adapted to hold a liquid or other material for trapping or repelling crawling pests such as slugs. In this preferred embodiment, each well 44 is formed by the raised lip 40, the panel 42, and a rib 46 extending between the lip and the panel.

There are preferably two anchor holes 48 in the bottom 26. The anchor holes 48 accommodate stakes or other anchoring device that can be located through the holes and into the ground to anchor the bottom. There is also a generally circular knockout 50 formed in the bottom 26 by a plurality of perforations 52. The knockout 50 can be removed to provide an opening in the bottom to give ground dwelling pests, for example moles, access to the interior of the enclosure 22.

Figure 16:
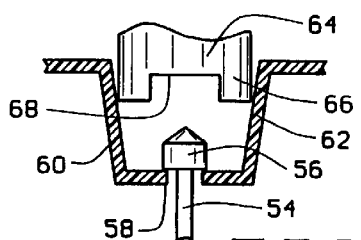
FIG. 16 is a partial cross-sectional view of the locking device for securing the cover on the bottom shown in its locked position.
Figure 17:
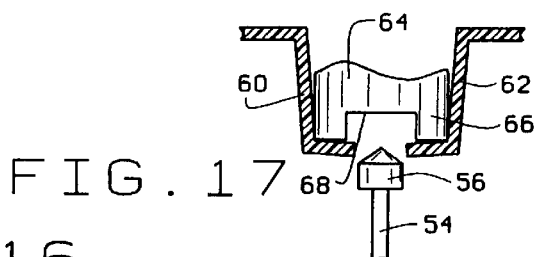
FIG. 17 is a partial cross-sectional view of the locking device, shown in its unlocked position.

There are preferably two locking tabs 54 projecting upwardly from the plate 38. The upper ends of the locking tabs 54 have an enlarged head 56. As best shown in FIGS. 16 and 17, the cover 24 has recesses 58 therein formed by two resilient generally semi-cylindrical flaps 60 and 62 that engage the enlarged head 56 to secure the cover 24 on bottom 26. The cover 24 can be released from the bottom with special tool 64 that has a distal end 66 adapted to fit over the head 56 and having a channel 68 that fits over the top of the tab 54 so that the tool can be pushed sufficiently downwardly over the head to separate the flaps 60 and 62, releasing them from engagement with the head.

The bottom 26 also includes the base 70 of the bait station 28. The base 70 comprises a cylindrical wall 72 projecting upwardly from the plate 38, and having a plurality of teeth 74 on its exterior. There are a plurality of curved panels 76 extending upwardly from the upper edge of the wall 72, the panels 76 are equally spaced about the circumference of the wall, separated by gaps 78. Inside the circular wall 72 there are four brackets 80 for engaging the bottom of a standard-sized existing bait block.

The top 82 of the bait station 28 comprises a generally cylindrical sidewall 84. There are a plurality of cutouts or gaps 86 in the bottom of the sidewall 84, forming a plurality of panels 88. There is a generally horizontal circular panel 90 inside the sidewall 84. The bottom of the sidewall 84 is adapted to fit over the circular wall 74, forming a bait chamber 92. There are a plurality of triangular teeth 94 depending downwardly from the underside of the panel 90, into the bait chamber 92 for engaging a bait block placed in the bait chamber. The inside surface of the lower portion of the sidewall 84 that fits over the circular wall 72 has a plurality of teeth 96 adapted to engage the teeth 74 on the circular wall. The teeth 96 on the top 82 mesh with the teeth 74 on the circular wall 72 to lock the top relative to the base 70. Access to the interior of the bait chamber 92 is controlled by the relative positions of the gaps and the panels on the top 82 and the circular wall 72. When the gaps 78 and 86 are aligned, the bait chamber 92 is readily accessible. When the panels overlap some of the gaps 78 and 86, access to the bait chamber is more restricted.

There are a plurality of slits 98 in the upper portion of the sidewall 84, above the panel 90. The upper end of the top 82 is adapted to engage a retainer ring 102 formed on the inside of the cover. The top of the bait station and the cover cooperate to form an upper bait chamber 100 for holding insect bait.

OPERATION

In operation the integrated pest management system 20 is placed in the area to be controlled, and adapted for the particular type of pest or pests to be controlled. The bottom 26 is placed on the ground. Stakes can be driven through the anchor holes 48 to anchor the bottom to the ground. A bait block is placed in the brackets 80 in side the base 70 of the bait station. The top 82 is placed over the circular wall 72, with the panels 88 on the top oriented with respect to the panel 76 on the wall to provide the desired amount of access to the bait in the bait chamber 92. If desired an insect bait and poison could be placed in the upper bait chamber 92. The bait attracts pests into the enclosure, through the slits 98 into the upper bait chamber 100. For example, dry ice could be placed into the upper bait chamber to attack ticks. A liquid, such as beer, can also be placed in the wells 44 to attract and trap snails and slugs.

Depending upon the type of pests being controlled, the panels 36 may be installed in the channels 34 in the doorways 32. Openings may be made in the panels of the appropriate size and shape for the pest being controlled.

The cover is then aligned with the base and pressed down. The tapering configuration of the top of the enlarged heads 56 separates the flaps 60 and 62, which resiliently snap back to engage the underside of the head once the head clears the flaps. The device is then ready for use.

To service the device the cover 24 is removed by inserted the distal end 66 of the tool 64 into the recesses 58 to release the flaps 60 and 62 from the heads 56. The cover 24 can then be lifted from the bottom 26, and the interior of the enclosure cleaned and serviced.

In the case of use in controlling moles, the knock-out 50 is removed from the bottom 26 to form an access opening. The bottom 26 is then anchored over a mole hole by aligning the access opening with the mole hole, and securing the bottom in position with one or more stakes through the anchor holes 48. The panels 36 are inserted into the channels 34 of the doorways 32, and the cover 24 installed over the base. A one-way collar can be secured around the accesses opening to allow a mole or other animal to enter from below but prevent the animal from exiting.

I claim:

1. An integrated pest management system comprising:
    a cover and a bottom defining an enclosure and configured to resemble a natural rock and said cover interfitting on said bottom; at least one doorway in the cover, allowing access to the enclosure; and a bait station inside the enclosure for holding bait, wherein the bait station comprises a cylindrical cap having a chamber, and a plurality of spaced apart curved panels, said cylindrical cap rotatably mounted on a circular wall formed on said bottom, serving as a base of the bait station, said circular wall having a plurality of spaced apart curved panels, spaces between the curved panels on said circular wall and the curved panels on the cylindrical cap defining adjustable access openings to the chamber of the bait station, the size of the access openings being adjustable by the relative rotation of said cylindrical cap and said bottom.

2. The integrated pest management system according to claim 1 further comprising a knockout in the bottom which can be removed to form a opening in the bottom through which ground dwelling pests can enter the enclosure.

3. The integrated pest management system according to claim 1 further comprising at least one releasable latch for securing the covered on the bottom, the latch comprising a locking tab projecting upwardly from the bottom and having an enlarged head, and two flexible tabs depending from the covered, which oppositely engage the enlarged head, but which can be concurrently deflected out of engagement with the enlarged head to release the cover from the bottom.

4. The integrated pest management system according to claim 1 further comprising a upper bait chamber on a top of the cylindrical cap.

5. The integrated pest management system according to claim 4 wherein the upper bait chamber on said top of the cylindrical cap comprises a sidewall having a plurality of slots therein; a retainer ring, formed on the inside of said cover, which positions and receives the top of the cylindrical cap when said cover is secured on the bottom.

6. An integrated pest management system comprising:
   a enclosure comprising a bottom and a cover interfitting on said bottom, said cover having at least one doorway therein;
   a panel formed on the bottom inside the enclosure, opposing but spaced from the said at least one doorway to limit the size of the pest that can enter the enclosure; and
   a bait station inside the enclosure for holding bait, wherein the bait station comprises a cylindrical cap having a chamber and, a plurality of spaced apart curved panels, said cylindrical cap rotatably mounted on a circular wall formed on the bottom and serving as a base of the bait station, said circular wall having a plurality of spaced apart curved panels, spaces between the curved panels on said circular wall and the curved panels on the cylindrical cap defining adjustable access openings to the chamber of the bait station, the size of the access openings being adjustable by relative rotation of said cylindrical cap and said bottom.

7. The integrated pest management system according to claim 6 further comprising a plurality of cuttable panels, and wherein there is a slot peripherally adjacent said at least one doorway for mounting said cuttable panels in the doorways.

8. The integrated pest management system according to claim 6 further comprising a upper bait chamber on a top of the cylindrical cap.

9. The integrated pest management system according to claim 8 wherein the upper bait chamber on said top of the cylindrical cap comprises a sidewall having a plurality of slots therein; a retainer ring, formed on the inside of said cover, which positions and receives the top of the cylindrical cap when said cover is secured on the bottom.

10. The integrated pest management system according to claim 6 further comprising a well, formed in the bottom, inside said enclosure adjacent the doorway for holding a substance to trap crawling pests that crawl into the enclosure.

11. The integrated pest management system according to claim 6 wherein said cover having the appearance of a rock.

12. The integrated pest management system according to claim 6 wherein said cover has a irregular, natural rock appearance.

\* \* \* \* \*